J. M. BREEDLOVE.
PIPE THREAD RESHAPER.
APPLICATION FILED AUG. 12, 1913.
1,118,732.
Patented Nov. 24, 1914.
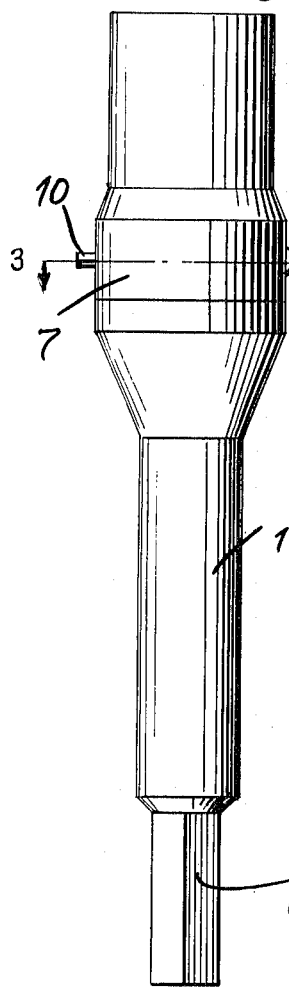
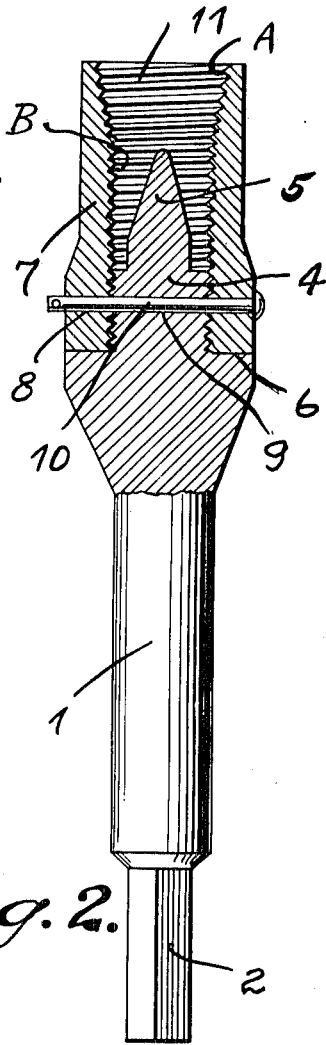
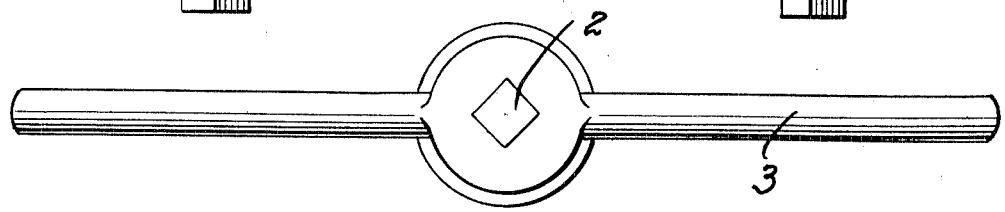
Fig. 1. Fig. 3. Fig. 2. Fig. 4.
Witnesses
M. S. Watson
Inventor
J. M. Breedlove
By
Attorneys

UNITED STATES PATENT OFFICE.

JOHN M. BREEDLOVE, OF PORTSMOUTH, VIRGINIA.

PIPE-THREAD RESHAPER.

1,118,732.

Specification of Letters Patent.

Patented Nov. 24, 1914.

Application filed August 12, 1913. Serial No. 784,376.

*To all whom it may concern:*

Be it known that I, JOHN M. BREEDLOVE, a citizen of the United States, residing at Portsmouth, in the county of Norfolk, State of Virginia, have invented certain new and useful Improvements in Pipe-Thread Reshapers; and I do hereby declare the following to be a full, clear, and exact description of the invention, such as will enable others skilled in the art to which it appertains to make and use the same.

The present invention is directed to improvements in tools for re-shaping the damaged ends of conduits.

The invention has for its object to provide a tool which can be readily placed in engagement with the damaged threaded ends of conduits, and rotated so as to reshape the conduits for engagement by standard female couplings.

With this and other objects in view, this invention resides in the novel features of construction, formation, combination and arrangement of parts to be hereinafter more fully described, claimed and illustrated in the accompanying drawing, in which:—

Figure 1 is a side elevation of the device. Fig. 2 is a longitudinal sectional view through the device. Fig. 3 is a sectional view on line 3—3 of Fig. 1. Fig. 4 is an end view of the device.

Referring to the drawing, the numeral 1 designates the shank, the same being preferably circular in cross-section and is provided at one end with a squared extension 2, upon which is engaged the handle 3, or if desired an ordinary wrench may be employed for rotating the shank. The other end of the shank 1 is provided with a reduced threaded extension 4, which terminates in a conical head 5, the purpose of which will appear later. By providing the reduced extension 4 an annular shoulder 6 is produced and limits the movement of the sleeve 7, said sleeve being threaded interiorly, a number of said threads engaging the extension 4. The sleeve 7 is provided with registered perforations 8, which are designed to register with the bore 9 formed in the extension 4 after which a pin 10 is inserted so as to prevent disengagement of the sleeve. The threads 11 of the sleeve are tapered from the point A to the point B, so that when a conduit is placed in the sleeve and the shank 1 rotated the threads of the conduit will be effectually reshaped. By providing the conical head 5 a conduit pipe which has been bent or has indentations therein, will be readily shaped, and at the same time during rotation of the shank the threads upon the conduit will be reshaped upon engagement by the threads 11 of the sleeve.

What is claimed is:—

1. A tool of the class described comprising a shank having a reduced threaded extension formed upon one end thereof and providing an annular shoulder, a sleeve threaded upon the reduced extension, the major portion of the said sleeve having its threads tapered, a conical head carried by the extension, and means passing through the sleeve and said extension to prevent accidental displacement of said sleeve.

2. A tool of the class described comprising a shank having a reduced extension formed on one end thereof, an internally threaded sleeve removably secured to said extension, the diameter of the threaded bore gradually increasing toward the open end thereof, and a head carried by the extension and projecting within the bore, the diameter of the head being less than the diameter of the bore.

In testimony whereof, I affix my signature, in the presence of two witnesses.

JOHN M. BREEDLOVE.

Witnesses:
T. H. McKINNEY,
H. O. EVERITT.